(12) United States Patent
Hatanaka et al.

(10) Patent No.: US 8,655,975 B2
(45) Date of Patent: Feb. 18, 2014

(54) HOME APPLIANCE MANAGING SYSTEM

(75) Inventors: Tomoyuki Hatanaka, Yamato Takada (JP); Osamu Sekine, Toyonaka (JP); Shuji Murakami, Takaishi (JP); Hiroyasu Nakanishi, Nara (JP)

(73) Assignee: Panasonic Corporation, Osaka (JP)

( * ) Notice: Subject to any disclaimer, the term of this patent is extended or adjusted under 35 U.S.C. 154(b) by 57 days.

(21) Appl. No.: 13/319,954

(22) PCT Filed: May 11, 2010

(86) PCT No.: PCT/JP2010/057935
§ 371 (c)(1),
(2), (4) Date: Dec. 30, 2011

(87) PCT Pub. No.: WO2010/131638
PCT Pub. Date: Nov. 18, 2010

(65) Prior Publication Data
US 2012/0096107 A1 Apr. 19, 2012

(30) Foreign Application Priority Data
May 11, 2009 (JP) .................................. 2009-114902

(51) Int. Cl.
*G06F 15/167* (2006.01)
(52) U.S. Cl.
USPC ........................................................ 709/213
(58) Field of Classification Search
USPC .................................................. 709/224, 213
See application file for complete search history.

(56) References Cited

U.S. PATENT DOCUMENTS

| 6,675,197 | B1* | 1/2004 | Satoh et al. ................... 709/204 |
| 2004/0260769 | A1 | 12/2004 | Yamamoto |
| 2006/0173997 | A1* | 8/2006 | Tullberg et al. ............... 709/224 |
| 2010/0217837 | A1* | 8/2010 | Ansari et al. .................. 709/218 |

FOREIGN PATENT DOCUMENTS

| JP | 11-112541 | 4/1999 |
| JP | 2000-250864 | 9/2000 |
| JP | 2005-10970 | 1/2005 |
| JP | 2005-92579 | 4/2005 |

* cited by examiner

*Primary Examiner* — Benjamin R Bruckart
*Assistant Examiner* — Sibte Bukhari
(74) *Attorney, Agent, or Firm* — Greenblum & Bernstein, P.L.C.

(57) ABSTRACT

The home appliance managing system includes a plurality of central managing devices and a center server. The center server is connected to the plurality of the central managing devices, and stores plural data used at home appliances. When the central managing device stores predetermined data requested by the home appliance, the central managing device sends the predetermined data to the home appliance. When the central managing device does not store the predetermined data, the central managing device requests the predetermined data from the center server. The center server sends the predetermined data to the central managing device in response to the request from the central managing device. The central managing device sends the predetermined data received from the center server to the home appliance and stores the same data. The center server selects the cache data from the plural data on the basis of the data previously sent to the central managing device, and sends the cache data to the central managing device. The central managing device stores the cache data received from the center server.

6 Claims, 6 Drawing Sheets

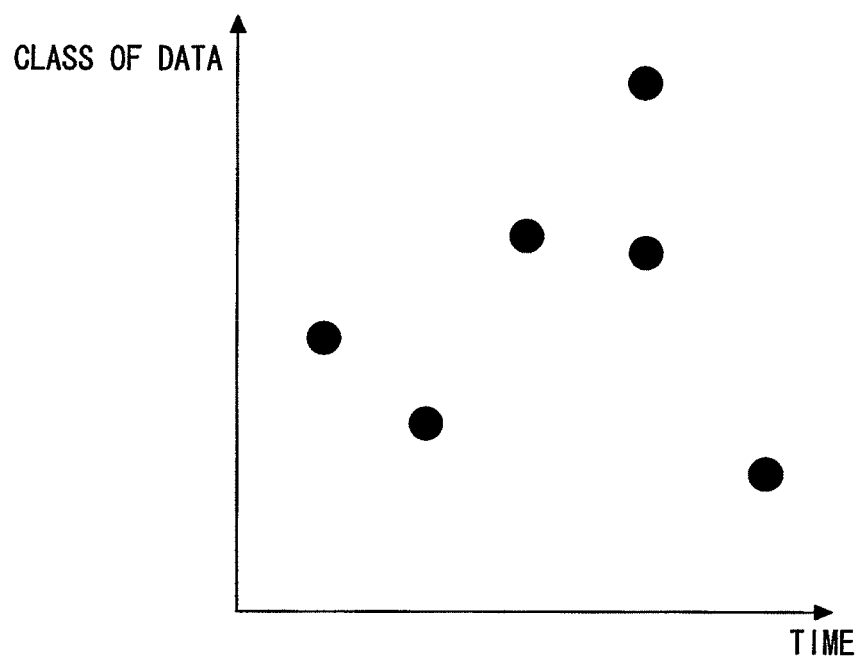

HOME APPLIANCE MANAGING SYSTEM

TECHNICAL FIELD

The present invention is directed to a home appliance managing system.

BACKGROUND ART

In the past, there have been various network systems (e.g., home appliance managing systems). The home appliance managing system includes central managing devices and a center server. The central managing device is configured to monitor and control one or more home appliances (e.g., control panels, lighting equipment, air conditioning equipment, and various security devices) installed in a residence. The center server is connected to the central managing devices via the Internet. The center server is configured to store various data. The central managing device obtains data from the center sever in response to a request from the home appliance, and sends the obtained data to the home appliance. The home appliance provides a predetermined service (monitoring the status of the home appliance, controlling turning on and off the lighting equipment, controlling turning on and off the air conditioning equipment, and locking and unlocking an electrical lock) to a user on the basis of the data obtained from the center server via the central managing device.

However, when the home appliance provides a service (e.g., a display control user interface) to a user with high speed response, the home appliance needs to access the center server via the central managing device for obtaining the data each time the user requests, and therefore requires much time for completion of the service and suffers from lowered response.

In view of the above, there has been provided a technique to provide a cache memory to a device (e.g., central managing devices) on the network (JP 11-112541 A). The cache memory is configured to store (cache) once obtained data, as cache data. In this arrangement, when the home appliance requests the same data, the central managing device can send the cache data to the home appliance without accessing the center server.

However, the central managing device cannot obtain the cache data unless the home appliance requests the data once at least. Therefore, with regard to the data which the home appliance has not requested, the central managing device needs to access the center server. Consequently, it is difficult to exhibit the sufficient response speed.

DISCLOSURE OF INVENTION

In view of the above insufficiency, the present invention has been aimed to propose a home appliance managing system which can decrease the number of times at which the central managing device accesses the center server, thereby improving the response speed.

The home appliance managing system in accordance with the present invention includes a plurality of central managing devices and a center server. Each central managing device is connected to a home appliance. The center server is connected to the plurality of the central managing devices via a transmission path. The center server includes a data control unit, a data storage unit configured to store data used by the home appliance, and a data prediction unit. The central managing device includes a managing control unit and a data caching unit. The managing control unit is configured to, in response to request of predetermined data from the home appliance, judge whether or not the data caching unit stores the predetermined data, and, when the data caching unit stores the predetermined data, obtain the predetermined data from the data caching unit and send the same to the home appliance, and, when the data caching unit does not store the predetermined data, request the center server to provide the predetermined data. The data control unit is configured to, in response to a request of the predetermined data from the managing control unit, obtain the requested predetermined data from the data storage unit and send the same to the managing control unit. The managing control unit is configured to, upon receiving the predetermined data from the data control unit, send the predetermined data to the home appliance and store the same in the data caching unit. The data prediction unit is configured to select cache data from the data stored in the data storage unit on the basis of the data which is sent once from the center server to at least one of the central managing devices. The cache data is defined as data to be sent to the central managing device preliminarily. The data control unit is configured to send the cache data selected by the data prediction unit to the managing control unit. The managing control unit is configured to, upon receiving the cache data from the data control unit, store the cache data in the data caching unit.

In a preferred aspect, the center server further includes a group managing unit. The group managing unit is configured to store a history for each central managing device. The history includes a class of the data which the central managing device obtains from the center server and a timing at which the central managing device obtains the data. The group managing unit is configured to determine, on the basis of the history, an obtaining pattern of data which the central managing device obtains from the center server, for each central managing device, and calculate a degree of similarity between the obtaining patterns of the central managing devices. The group managing unit is configured to judge that the obtaining patterns are similar to each other, when the degree of the similarity is not less than a predetermined threshold. The group managing unit is configured to judge that the obtaining patterns are dissimilar from each other, when the degree of the similarity is less than the predetermined threshold. The group managing unit is configured to classify the central managing devices having the obtaining patterns similar to each other into the same group, and to classify the central managing devices having the obtaining patterns dissimilar from each other into different groups. The data prediction unit is configured to select same class data having the same class as that of the data which the center server sends once to at least one of the central managing devices belonging to a specific group, and treat such class data as the cache data to be sent to another central managing device belonging to the specific group.

In the above preferred aspect, preferably, the same class data is defined as data which is created with respect to each of the central managing devices belonging to the same group and is created at the same format by use of information relating to the individual central managing device.

In the above preferred aspect, preferably, the group managing unit is configured to perform grouping of the central managing devices at a predetermined interval. In the above preferred aspect, preferably, the managing control unit is configured to calculate a hit probability indicative of a probability that the data caching unit stores the data requested by the home appliance, and send the same to the center server. The group managing unit is configured to compare a predetermined value with the hit probability received from the managing control unit of the central managing device, and exclude the central managing device having the hit probability not greater than the predetermined value from the group which the central managing device belongs to.

In the above preferred aspect, the group managing unit is configured to select the lower predetermined threshold for the central managing device which is provided with the data caching unit having a larger memory capacity.

In another preferred aspect, the group managing unit is configured to divide the central managing devices into groups on the basis of contracts regarding data communication between the center server and the central managing device. The data prediction unit is configured to select data which said center server sends once to at least one of the central managing devices belonging to a specific group, and treat such data as the cache data to be sent to another central managing device belonging to the specific group.

BRIEF DESCRIPTION OF DRAWINGS

FIG. 6 is an explanatory diagram illustrating a data obtaining pattern.

BEST MODE FOR CARRYING OUT THE INVENTION

Figure 1:
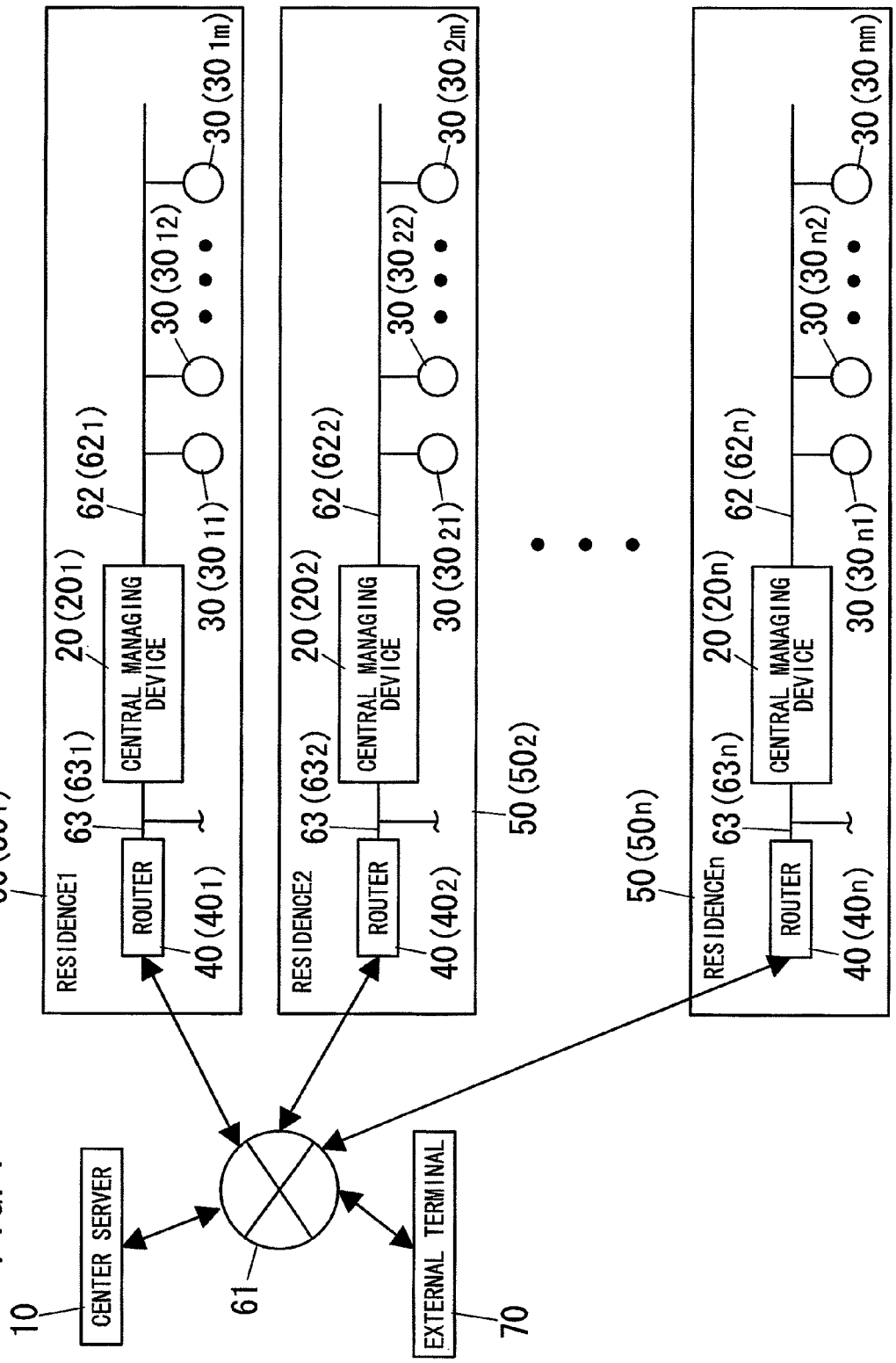
FIG. 1 is a diagram illustrating a configuration of a home appliance managing system of one embodiment of the present invention.

FIG. 1 illustrates a configuration of a home appliance managing system of the present embodiment. The home appliance managing system includes a plurality of home system 50 and a center server 10. Each home system 50 includes a central managing device 20 configured to monitor and control home appliances 30. The center server 10 is connected to the central managing device 20 of each home system 50 via the Internet (transmission path) 61.

For example, the home system 50 is installed in a residence such as a single unit housing and a multiple unit housing. Each home system 50 includes a single central managing device 20. With regard to each home system 50, the central managing device 20 is connected to one or more home appliances 30 installed in the same residence by use of a communication line 62. Further, each home system 50 includes a terminal device (not shown) installed in a residence. The terminal device is connected to the central managing device 20 via a home network 63. For example, the above terminal device is a display device which is used for displaying the following monitoring information.

In addition, the home system 50 includes a router 40. The router 40 is installed in the residence, and is configured to make connection between the Internet 61 to which the center server 10 is connected and the home network 63 to which the central managing device 20 is connected. Therefore, the center server 10 is connected to the central managing device 20 via the router 40 and the home network 63, and is allowed to communicate with the central managing device 20.

In the following explanation, in order to distinguish between plural same components (the central managing devices 20, the home appliances 30, the routers 40, the home systems 50, the communication lines 62, and the home networks 63), a suffix "n" (n=1, 2, 3, . . . ) is attached to the reference numerals thereof. In particular, the reference numerals of the home appliances 30 are expressed with suffixes "n", "m" (n=1, 2, 3, . . . , m=1, 2, 3, . . . ).

The home appliance 30 is, for example, a control panel, lighting equipment, air conditioning equipment, and security equipment. The home appliance 30 is configured to provide a predetermined service (e.g., monitoring the status of the home appliance, controlling turning on and off the lighting equipment, controlling turning on and off the air conditioning equipment, and locking and unlocking an electrical lock) to a user. In the present embodiment, a unique ID information (e.g., a MAC address) used for identifying the home appliance 30 is assigned to the home appliance 30. The central managing device 20 monitors and controls its own home appliance 30 by use of the ID information.

The home appliance 30 is configured to, when the home appliance 30 does not hold necessary data for providing the predetermined service, request the necessary data from the central managing device 20.

The central managing device 20 has a packet processing function, a path switching function, a network security function, and a function of a control point of a UPnP (universal plug and play). The central managing device 20 is realized by use of a home server which controls receiving and sending data in a network, for example.

Figure 2:
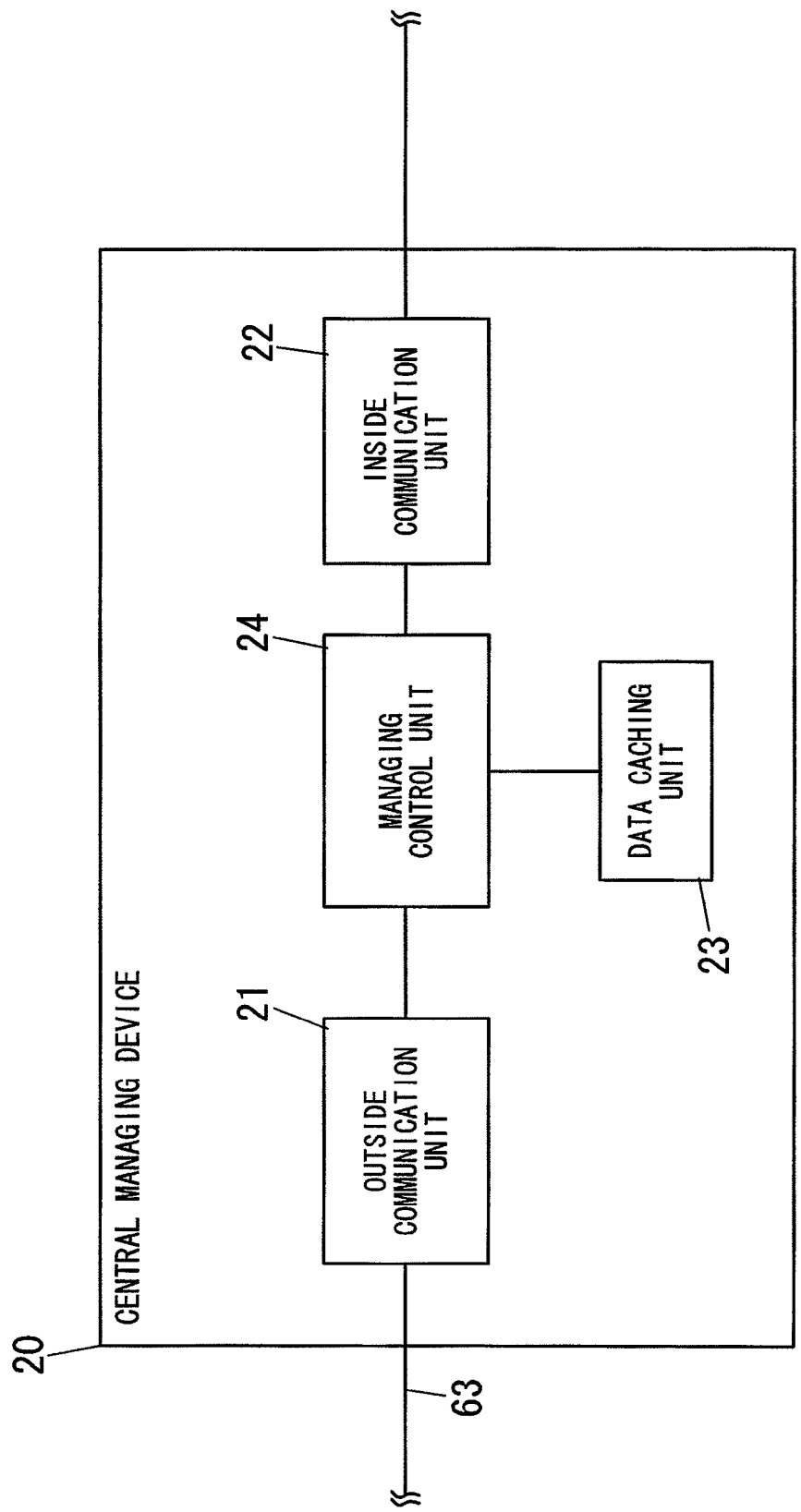
FIG. 2 is a block diagram illustrating a central managing device of the above home appliance managing system.

As shown in FIG. 2, the central managing device 20 includes an outside communication unit (first network communication unit) 21, an inside communication unit (appliance communication unit) 22, a data caching unit (cache memory) 23, and a managing control unit 24.

The outside communication unit 21 is configured to communicate with the center server 10 via the home network 63 and the Internet 61.

The inside communication unit 22 is configured to communicate with the home appliances 30 via the communication line 62.

The data caching unit 23 is used for storing data to be used by the home appliance 30.

The managing control unit 24 is configured to control the outside communication unit 21, the inside communication unit 22, and the data caching unit 23.

The managing control unit 24 is configured to, upon being requested to provide predetermined data (data requested from the home appliance 30) from the home appliance 30, judge whether or not the data caching unit 23 stores the predetermined data. The managing control unit 24 is configured to, upon judging that the data caching unit 23 stores the predetermined data, obtain the predetermined data from the data caching unit 23 and send the same data to the home appliance 30 requesting the predetermined data. The managing control unit 24 is configured to, upon judging that the data caching unit 23 does not store the predetermined data, request the predetermined data from the center server 10.

The managing control device 24 is configured to, upon receiving the predetermined data from the center server 10, send the predetermined data to the requesting home appliance 30 and store the same data in the data caching unit 23.

In addition, the managing control unit 24 is configured to, upon receiving the after-mentioned cache data from the center server 10, store the received cache data in the data caching unit 23.

Figure 3:
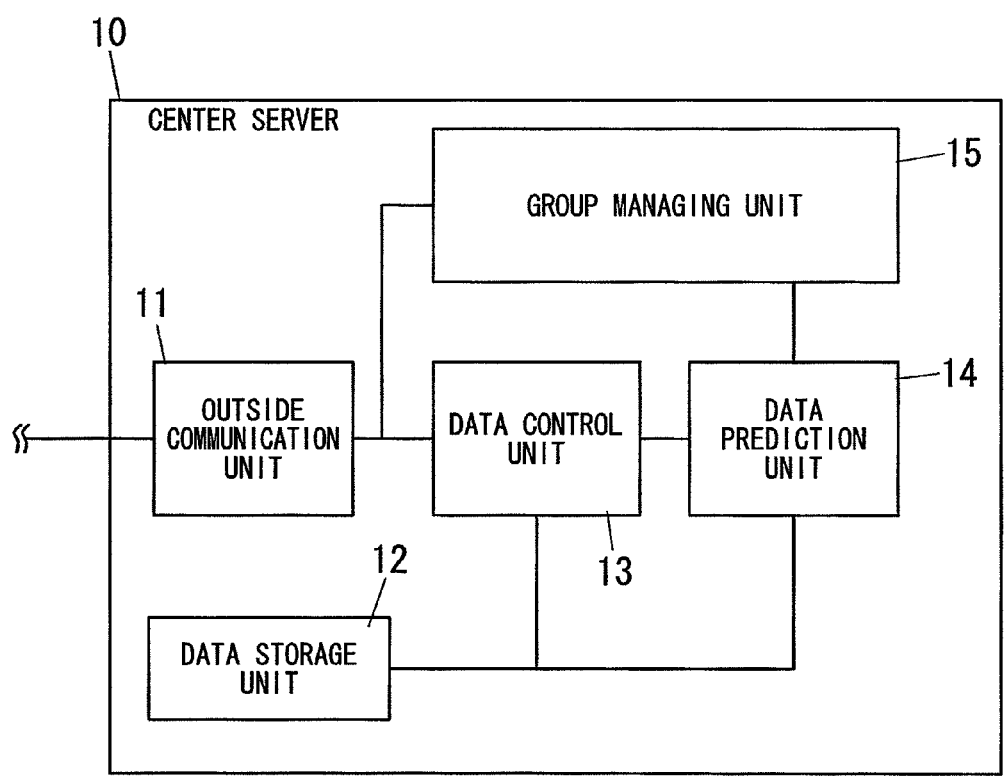
FIG. 3 is a block diagram illustrating a center server of the above home appliance managing system.

The center server 10 is installed in premises (e.g., a managing center of a service provider) different from residences where the home systems 50 are respectively installed. The center server 10 is realized by use of a common computer device having a network function. As shown in FIG. 3, the center server 10 includes an outside communication unit (second communication unit) 11, a data storage unit 12, a data control unit 13, a data prediction unit (cache data creation unit) 14, and a group managing unit 15.

The outside communication unit 11 is configured to communicate with the central managing device 20 via the home network 63 and the Internet 61.

The data storage unit 12 is configured to store various data. The various data includes data to be used by the home appliance 30 (e.g., data which is necessary for the home appliance 30 to provide the predetermined service to a user).

The group managing unit 15 is configured to perform grouping the central managing devices 20. The group managing unit 15 is configured to store a history for each central managing device 20, the history including a class of the data which the central managing device 20 obtains from the center server 10 and a timing at which the central managing device 20 obtains the data. The group managing unit 15 is configured to determine, on the basis of the history, an obtaining pattern (data obtaining pattern) with respect to the data which the central managing device 20 obtains from the center server 10, for each central managing device 20. The group managing unit 15 is configured to calculate a degree of similarity between the obtaining patterns of the central managing devices 20. The group managing unit 15 is configured to judge that the obtaining patterns are similar to each other when the degree of the similarity is not less than a predetermined threshold, and that the obtaining patterns are dissimilar from each other when the degree of the similarity is less than the predetermined threshold. The group managing unit 15 is configured to classify the central managing devices 20 having the obtaining patterns similar to each other into the same group, and classify the central managing devices 20 having the obtaining patterns dissimilar from each other into different groups.

The data prediction unit 14 is configured to select the cache data from the data stored in the data storage unit 12 on the basis of the data which is sent once from the center server 10 to at least one of the central managing devices 20, the cache data being defined as data to be sent to the central managing device 20 preliminarily. For example, the data prediction unit 14 is configured to select, on the basis of the result of the grouping performed by the group managing unit 15, same class data having a class same as that of the data which the center server 10 sends once to at least one of the central managing devices 20 belonging to a specific group, and treat such class data as the cache data to be sent to another central managing device 20 belonging to the specific group.

The data control unit 13 is configured to, upon being requested to provide data by the managing control unit 24 of the central managing device 20, obtain the requested data from the data storage unit 12 and control the outside communication unit 11 in such a manner to send the requested data to the managing control unit 24 of the central managing device 20. The data control unit 13 is configured to send the cache data selected by the data prediction unit 14 to the managing control unit 24.

Besides, there is an external terminal 70 which is connected to the center server 10 via the Internet 61. For example, the external terminal 70 is a personal computer connectable to the Internet 61, a mobile phone, and a PDA (Personal Digital Assistance). The external terminal 70 is configured to establish data communication with the center server 10 via the Internet 61. Therefore, use of the external terminal 70 allows a user to monitor and control the home appliance from outside, for example. The center server 10 has a function of relaying a message such as a message for the central managing device 20 sent from a terminal device such as the external terminal 70 via the Internet 61 and a message for a terminal device which does not belong to the home network 63 sent from the central managing device 20. Further, the center server 10 has a function of integrating information from each residence, and has a web server function for providing information such as a weather report and a traffic report. Besides, the external terminal 70 having functions of the center server 10 and a function of connecting to the Internet is well known, and explanations and drawings regarding detailed configurations thereof are deemed unnecessary.

In the following, an explanation is made to the operation of the home appliance managing system of the present embodiment.

When the home appliance 30 stores no predetermined data used for providing the predetermined service to a user, the home appliance 30 sends, to the central managing device 20, an obtaining request for requesting the predetermined data. In other words, the home appliance 30 which intends to provide the predetermined service to a user sends the obtaining request to the central managing device 20 in order to request the data necessary for providing the service. With regard to the central managing device 20, upon receiving the obtaining request from the home appliance 30 via the inside communication unit 22, the managing control unit 24 judges whether or not the data caching unit 23 holds the data (predetermined data) corresponding to the received obtaining request. When the data caching unit 23 stores the predetermined data, the managing control unit 24 obtains the predetermined data from the data caching unit 23 and sends the same data to the home appliance 30.

Meanwhile, when the data caching unit 23 stores no predetermined data, the managing control unit 24 controls the outside communication unit 21 in such a manner to send, to the center server 10, a sending request for requesting the predetermined data from the center server 10. With regard to the center server 10, upon receiving the sending request via the outside communication unit 11, the data control unit 13 obtains, from the data storage unit 12, the data (predetermined data) corresponding to the received sending request. The data control unit 13 controls the outside communication unit 11 in such a manner to send, to the central managing device 20, the predetermined data obtained from the data storage unit 12.

With regard to the central managing device 20, upon receiving the predetermined data from the center server 10 via the outside communication unit 21, the managing control unit 24 sends the predetermined data to the home appliance 30.

As described in the above, upon receiving the obtaining request from the home appliance 30, the central managing device 20 accesses the center server 10 and obtains the data corresponding to the received obtaining request from the data storage unit 12 of the center server 10 and sends the obtained data to the home appliance 30.

Upon receiving the predetermined data from the central managing device 20, the home appliance 30 uses the received predetermined data to provide the predetermined service to the user.

In addition, the managing control unit 24 stores the predetermined data received from the center server 10 in the data caching unit 23. That is, the managing control unit 24 stores, in the data caching unit 23, the data which the managing control unit 24 obtains from the center server 10 and sends to the home appliance 30, and treats the stored data as the cache data.

Accordingly, next time the home appliance 30 requests the same data, the central managing device 20 can obtain the data requested by the home appliance 30 from the data caching unit 23 and then send the obtained data to the home appliance 30 without accessing the center server 10.

With regard to the center server 10, as described in the above, the group managing unit 15 analyzes the obtaining pattern of data which each central managing device obtains by accessing the center server 10. The group managing unit 15 judges whether or not the obtaining patterns are similar to each other on the basis of the result of the analysis. The group managing unit 15 classifies the central managing devices 20 on the basis of whether or not the obtaining patterns are similar to each other. The obtaining pattern includes the class of data which the central managing device 20 obtains from the center server 10 as well as the timing at which the central managing device 20 obtains the data. The group managing unit 15 refers to the result of the analysis of the obtaining patterns, and compares the obtaining patterns of the central managing devices 20 with each other, and then calculates the degree of the similarity (degree of pattern similarity) indicative of a degree (%) that the obtaining patterns are similar to each other. The group managing unit 15 classifies the central managing devices 20 indicating the degree of the similarity not less than the predetermined threshold (%) into the same group.

The data prediction unit 14 selects, on the basis of the result of the grouping performed by the group managing unit 15, same class data having the same class as that of the data which the center server 10 sends once to at least one of the central managing devices 20 belonging to a specific group, treats such class data as the cache data to be sent to another central managing device 20 belonging to the specific group.

For example, the center server 10 sends, to the central managing device $20_i$ ("i" is an integer), the data $D_i$ in response to the sending request. In this instance, the data prediction unit 14 determines, upon receiving the request for the data $D_i$ from one of the central managing devices $20_i$, that the request for the same data is also requested from the other central managing device $20_j$ ("j" is an integer but is not identical to "i") which belongs to the group same as the one central managing device $20_i$. Accordingly, the data prediction unit 14 selects, from the plural data $D_n$ stored in the data recordation unit 12, the data $D_i$ once sent to the central managing device 20, and treats such data as a cache data. The data control unit 13 controls the outside communication unit 11 in such a manner to transmit the cache data (data $D_i$) selected by the data prediction unit 14 to the other central managing device $20_j$ belonging to the group same as that of the central managing device $20_i$ which requested the data $D_i$.

Upon receiving the cache data from the center server 10, the central managing device $20_j$ stores the received cache data in the data caching unit 23. Therefore, when the home appliance 30 requests the central managing device $20_j$ to provide the data $D_i$ identical to the cache data, the central managing device $20_j$ transmits the cache data (data $D_i$) stored in the data caching unit 23 to the home appliance 30 without accessing the center server 10.

As described in the above, the home appliance managing system of the present embodiment includes the plurality of the central managing devices 20 each of which is connected to the home appliance 30, the center server 10 connected to the plurality of the central managing devices 20 via the Internet (transmission path) 61. The center server 10 includes the data control unit 13, the data storage unit 12 configured to store data used by the home appliance 30, and the data prediction unit 14. The central managing device 20 includes the managing control unit 24 and the data caching unit 23. The managing control unit 24 is configured to, in response to request of predetermined data from the home appliance 30, judge whether or not the data caching unit 23 stores the predetermined data, and, when the data caching unit 23 stores the predetermined data, obtain the predetermined data from the data caching unit 23 and send the same to the home appliance 30, and, when the data caching unit 23 does not store the predetermined data, request the center server 10 to provide the predetermined data. The data control unit 13 is configured to, in response to a request of the predetermined data from the managing control unit 24, obtain the requested predetermined data from the data storage unit 12 and send the same to the managing control unit 24. The managing control unit 24 is configured to, upon receiving the predetermined data from the data control unit 13, send the predetermined data to the home appliance 30 and store the same in the data caching unit 23. The data prediction unit 14 is configured to select the cache data from the data stored in the data storage unit 12 on the basis of the data which is sent once from the center server 10 to at least one of the central managing devices 20, the cache data being defined as data to be sent to the central managing device 20 preliminarily. The data control unit 13 is configured to send the cache data selected by the data prediction unit 14 to the managing control unit 24. The managing control unit 24 is configured to, upon receiving the cache data from the data control unit 13, store the cache data in the data caching unit 23.

Accordingly, it is possible to preliminarily store, in the central managing device 20, the data which the home appliance 30 does not yet request the central managing device 20 to provide. Thus, the response performance can be improved. Further, the center server 10 sends the data having the probability of being requested by the home appliance 30 to the central managing device 20 as the cache data. Therefore, a hit probability can be increased. The hit probability is defined as a probability that the data corresponding to the obtaining request from the home appliance 30 is already stored in the data caching unit 23.

Further, in the home appliance managing system of the present embodiment, the center server 10 further includes the group managing unit 15. The group managing unit 15 stores the history for each central managing device 20. The history includes the class of the data which the central managing device 20 obtains from the center server 10 and the timing at which the central managing device 20 obtains the data. The group managing unit 15 determines, on the basis of the history, the obtaining pattern of data which the central managing device 20 obtains from the center server 10, for each central managing device 20. The group managing unit 15 calculates the degree of the similarity between the obtaining patterns of the central managing devices 20. The group managing unit 15 judges that the obtaining patterns are similar to each other, when the degree of the similarity is not less than the predetermined threshold. The group managing unit 15 judges that the obtaining patterns are dissimilar from each other, when the degree of the similarity is less than the predetermined threshold. The group managing unit 15 classifies the central managing devices having the obtaining patterns similar to each other into the same group. The group managing unit 15 classifies the central managing devices having the obtaining patterns dissimilar from each other into different groups. The data prediction unit 14 is configured to select same class data having the same class as that of the data which the center server 10 sends once to at least one of the central managing devices 20 belonging to a specific group, treat such class data as the cache data to be sent to another central managing device 20 belonging to the specific group.

As explained in the above, the center server 10 classifies the central managing devices 20 into groups on the basis of the data obtaining patterns. Therefore, it is possible to improve the hit possibility of the data caching unit 23 of the central managing device 20 (it is possible to improve the hit probability concerning the cache data created by the center server 10).

Figure 4:
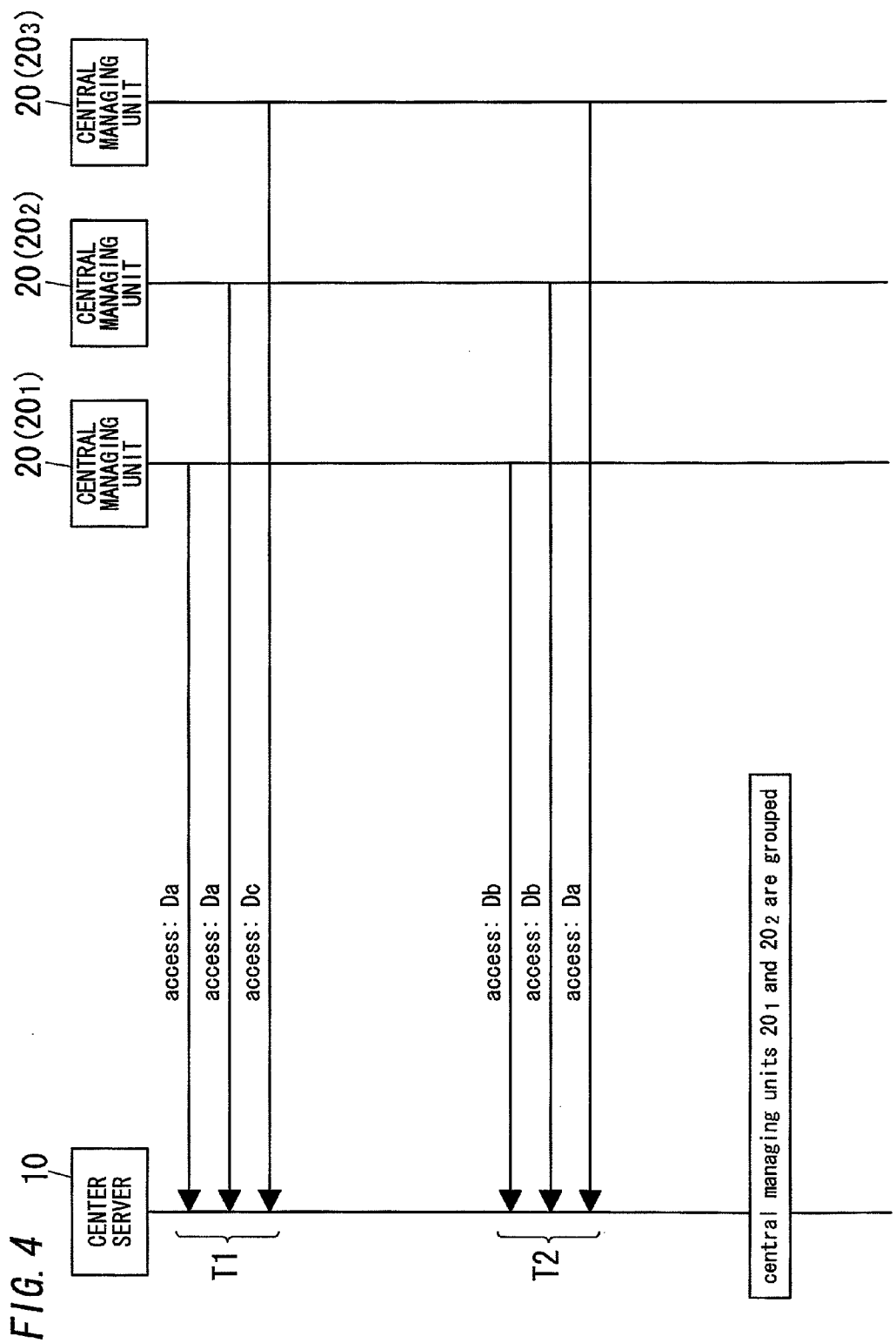
FIG. 4 is a sequence diagram illustrating grouping processing of the central managing devices performed by the above home appliance managing system.

For example, as shown in FIG. 4, the three central managing devices $20_1$, $20_2$, and $20_3$ are connected to the center server 10 in a manner to communicate with the center server 10.

In the period T1, the central managing devices $20_1$ and $20_2$ access the center server 10 for obtaining the data Da. Meanwhile, the central managing device $20_3$ accesses the center server 10 for obtaining the data Dc.

In the period T2 subsequent to the period T1, the central managing devices $20_1$ and $20_2$ access the center server 10 for obtaining the data Db. Meanwhile, the central managing device $20_3$ accesses the center server 10 for obtaining the data Da.

In this instance, the central managing devices $20_1$ and $20_2$ request the center server 10 to provide the same data Da during the period T1 and request the center server 10 to provide the same data Db during the period T2.

Accordingly, the group managing unit 15 of the center server 10 classifies, into the same group, the central managing devices $20_1$ and $20_2$ which are similar to each other with regard to the class of the data as well as the timing at which the data is obtained.

Figure 5:
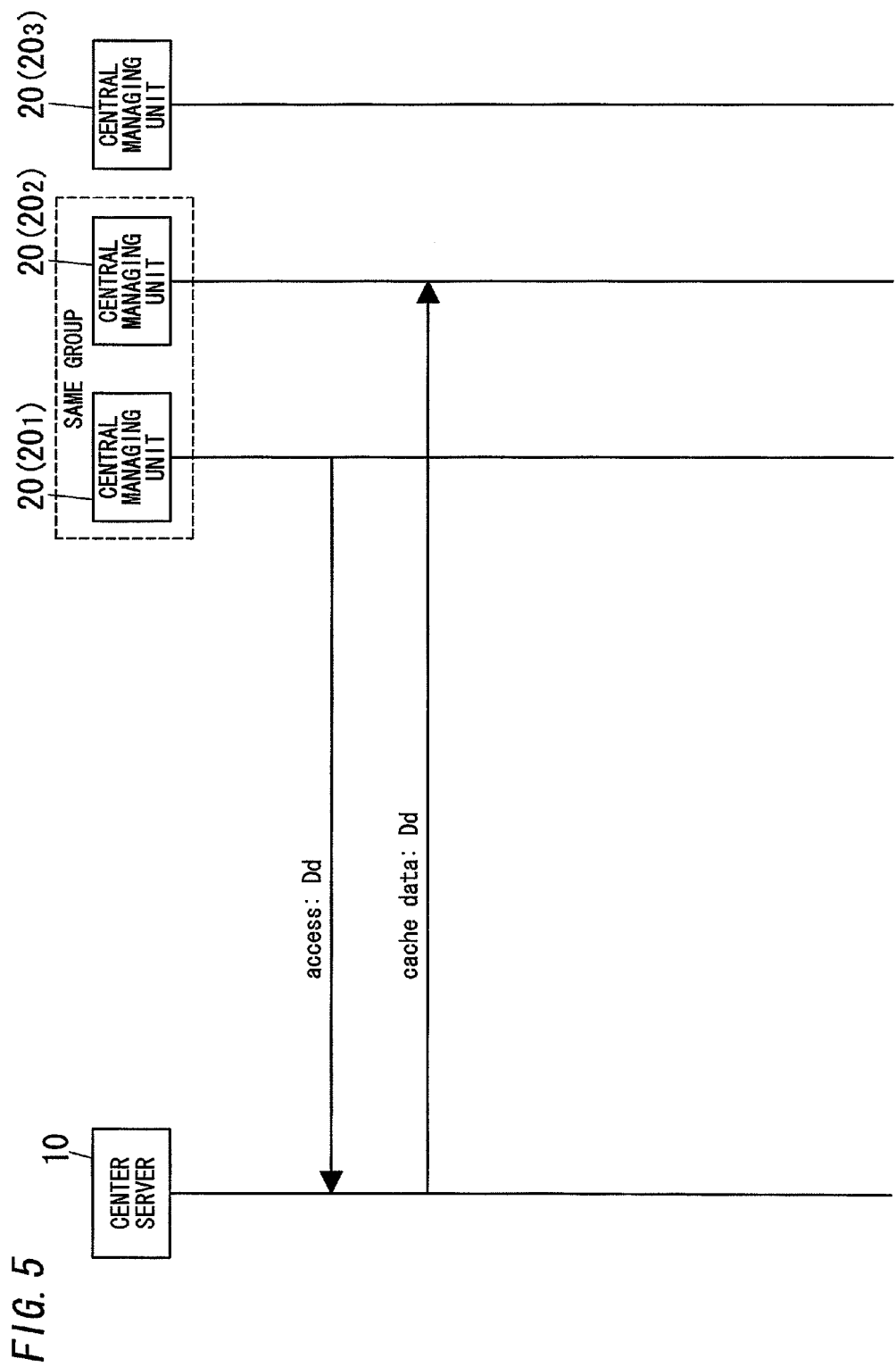
FIG. 5 is a sequence diagram illustrating sending processing of cache data performed by the above home appliance managing system.

Thereafter, as shown in FIG. 5, the central managing device $20_1$, in response to the request from its own home appliance 30, accesses the center server 10 to obtain the data Dd. In response, the data prediction unit 14 predicts that the central managing device $20_2$ belonging to the same group as that of the central managing device $20_1$ is likely to request the same data Dd. The data prediction unit 14 then selects the data Dd as the cache data. That is, the data prediction unit 14 predicts, on the basis of what data the central managing device $20_1$ requests from the center server 10, the data which the central managing device $20_2$ belonging to the same group as that of the central managing device $20_1$ is likely to request.

The data control unit 13 controls the outside communication unit 11 in such a manner to transmit the cache data (data Dd) selected by the data prediction unit 14 to the central managing device $20_2$ belonging to the same group as that of the central managing device $20_1$.

Upon receiving the cache data (data Dd) from the center server 10, the central managing device $20_2$ stores the received cache data in the data caching unit 23. Therefore, even if the home appliance 30 requests the data Dd from the central managing device $20_2$ first, the central managing device $20_2$ can send the data Dd to the home appliance 30 without accessing the center server 10 because the central managing device $20_2$ already stores the data Dd in the data caching unit 23.

The next explanation is made to a method of grouping processing of the central managing devices 20. FIG. 6 illustrates the obtaining pattern of the data with regard to the central managing device 20. In FIG. 6, the horizontal axis indicates time (a period of twenty-four hours, one week, one month, or one year), and the vertical axis indicates the class of the data. The obtaining pattern is updated each time the central managing device 20 obtains data (the center server 10 sends data to the central managing device 20).

The group managing unit 15 selects the two central managing devices $20_i$ and $20_j$ from all of the central managing devices 20. For each plot point of the obtaining pattern of the central managing device $20_i$ exhibiting the relatively small number of times of obtaining data (the number of times at which the central managing device obtains data from the center server 10), the group managing unit 15 selects, from plot points of the obtaining pattern of the central managing device $20_j$ exhibiting the relatively large number of times of obtaining data, the plot point closest to the plot point of the obtaining pattern of the central managing device $20_i$. The group managing unit 15 calculates the sum of distances between the plot point of the obtaining pattern of the central managing device $20_i$ and the corresponding plot point of the obtaining pattern of the central managing device $20_j$, and treats the calculated sum as the distance between the obtaining patterns of the central managing devices $20_i$ and $20_j$.

Thus, the group managing unit 15 calculates the distance between the obtaining patterns with regard to all combinations of the central managing devices 20.

When the total number of the groups into which the central managing devices 20 are classified is "X", the group managing unit 15 selects the total number "X" of the central managing devices 20 in descending order of the distance between the obtaining patterns. For each previously selected central managing device 20, the group managing unit 15 selects the central managing device 20 exhibiting the relatively close distance between the obtaining patterns with regard to the previously selected central managing device 20 and classifies it into the same group as that of the previously selected central managing device 20. Thus, the group managing unit 15 classifies all the central managing devices 20 into the groups having the number "X" of the same. According to this method, any one of all the central managing devices 20 is successfully classified into any one of the groups.

Besides, the group managing unit 15 may adopt the method using the obtaining patterns where any one of all the central managing devices 20 is successfully classified into any one of the groups. In contrast, the group managing unit 15 may adopt a method allowing coexistence of the central managing device 20 classified into a group and the central managing device 20 classified into no group.

The group managing unit may adopt another method of grouping. For example, it is possible to adopt a method of classifying all the central managing devices 20 into the groups having the number "X" of the same by applying a self-organizing method (e.g., feature vector and Kohonen network) with using two dimensional patterns converted from the obtaining patterns of the central managing device 20 as shown in FIG. 6.

Further, the group managing unit may adopt another method of grouping. For example, it is possible to adopt a method of classifying, into the same group, the central managing devices which show the number of times (or percentage) of obtaining the same class data within a predetermined period greater than a predetermined number of times (or percentage). This method allows coexistence of the central managing device 20 classified into a group and the central managing device 20 classified into no group.

In the aforementioned instance, the cache data is data (such as data of the weather report in the same region, and data of the time) common to the plural central managing devices 20 grouped into the same group. Alternatively, with regard to the plural central managing devices 20 of the same group, the cache data may be data having the same class but having different contents for each central managing device 20.

Next explanation is made to an instance where the cache data is defined to have the same class but have different contents for each central managing device 20. For example, the central managing device $20_i$ accesses the center server 10 and then obtains data indicative of average consumption power of the residence in which the central managing device $20_i$ is installed. In this situation, the data prediction unit 15 of the center server 10 predicts that the other central managing device $20_j$ classified into the same group as that of the central managing device $20_i$ requests data indicative of average consumption power of the residence in which the central managing device $20_j$ is installed. Consequently, the center server 10 selects, as the cache data, the data indicative of average consumption power of the residence in which the central managing device $20_j$ is installed, and sends the selected cache data to the other central managing device $20_j$.

That is, the same class data may be data which is created with respect to each of the central managing devices 20 belonging to the same group and is created in the same format by use of information relating to the individual central managing device 20.

In this instance, the center server 10 can create the cache data to be sent to the central managing device 20 in response to a situation surrounding the central managing device 20. Therefore, usability can be improved.

In the aforementioned instance, upon sending the data to one central managing device 20 of the plural central managing devices 20 classified into the same group, the center server 10 selects, as the cache data, the data having a class same as that of the data sent to the above one central managing device 20, and sends the selected cache data to the other central managing devices 20 classified into the same group as that of the above one central managing device 20.

Alternatively, the center server 10 may be configured to, upon sending the same class data to two or more central managing devices 20 of the plural central managing devices 20 classified into the same group, select, as the cache data, the data having a class same as that of the data sent to the above two or more central managing devices 20, and send the selected cache data to the other central managing devices 20 classified into the same group as that of the above two or more central managing devices 20.

This configuration can improve the probability that the cache data is actually used at the home appliance 30, and can prevent sending, to the central managing device 20, useless cache data which is not used at the home appliance 30. In other words, it is enabled to decrease the number of candidates for the cache data, and thus avoiding creation of unnecessary cache data.

In addition, according to the home appliance managing system of the present embodiment, the group managing unit 15 is configured to perform the grouping processing of the central managing devices 20 at a predetermined interval.

For example, the group managing unit 15 performs processing (analyzing processing) of analyzing the obtaining pattern of each central managing device 20 at the predetermined interval (periodically), and performs the grouping processing of the central managing devices 20 based on the result of the analyzing processing. In other words, the groups of the central managing devices 20 are updated at the predetermined interval. Besides, the group managing unit 15 may be configured to perform the grouping processing of the central managing devices 20 each time the number (total access number) of times at which the center server 20 is accessed by the central managing device 20 reaches a predetermined number of times.

Accordingly, in response to change of the obtaining pattern of the central managing device 20, the central managing devices 20 are classified into groups appropriately. Therefore, it is possible to prevent decreasing the hit probability of the central managing device 20.

In addition, the cache data (i.e., data which the central managing device 20 acquires from the center server 10) has an expiration time. The central managing device 20 deletes the expired cache data from the data caching unit 23.

Besides, when the center server 10 classifies the central managing device 20 into the group different from the current group, the center server 10 announces to the central managing device 20 that the group to which the central managing device 20 belongs is changed. Upon acknowledging that the group to which the central managing device 20 belongs is changed, the central managing device 20 compares a predetermined period with a remaining period from the current time to the expiration time of the cache date stored in the data caching unit 23. The central managing device 20 determines the cache date having the remaining period longer than the predetermined period as new cache data. The central managing device 20 determines, as old cache data, the cache date having the remaining period which is not longer than the predetermined period. The central managing device 20 deletes the old cache data from the data caching unit 23 and leaves the new cache data only. This configuration enables efficient use of the storage capacity of the data caching unit 23 irrespective of change of the group to which the central managing device belongs.

Further, the managing control unit 24 of each central managing device 20 calculates the hit probability of the data caching unit 23 with regard to the cache data, and sends the calculated hit probability to the center server 10. The group managing unit 15 of the center server 10 classifies, into the new group different from the current group, the central managing device 20 having the hit probability which is not greater than a predetermined value. The group managing unit 15 selects the group exhibiting the distance between the obtaining patterns which is approximate to that of the current group (pre-changed group), as the new group (post-changed group).

As explained in the above, with regard to the home appliance managing system of the present embodiment, the managing control unit 24 is configured to calculate the hit probability indicative of the probability that the data caching unit 23 stores the data requested by the home appliance 30, and send the same to the center server 10. The group managing unit 15 is configured to compare the predetermined value with the hit probability received from the managing control unit 24 of the central managing device 20, and exclude the central managing device 20 having the hit probability not greater than the predetermined value from the group which the central managing device 20 belongs to.

Accordingly, more appropriate grouping can be performed.

The group managing unit 15 preliminarily stores capacity information indicative of a maximum (maximum capacity) of a memory capacity of the data caching unit 23 of each of the central managing device 20. The group managing unit 15 selects the lower predetermined threshold (%) for the data caching unit 23 of the larger memory capacity, thereby increasing the number of the central managing devices 20 per one group. Conversely, the predetermined threshold becomes smaller for the data caching unit 23 having the smaller memory capacity, and therefore the number of the central managing devices 20 per one group is decreased.

Thus, the number of the cache data which the central managing device 20 obtains from the center server 10 is increased with an increase of the maximum of the memory capacity of the data caching unit 23. Therefore, it is possible to decrease the number of times at which the central managing device 20 accesses the center server 10.

Alternatively, the group managing unit 15 may vary the predetermined threshold on the basis of a free space (remaining capacity) of the data caching unit 23. In this modification, the group managing unit 15 obtains remaining capacity information indicative of the free space of the data caching unit 23 from each central managing device 20 periodically. The group managing unit 15 selects the lower predetermined threshold for the data caching unit 23 of the larger free space, thereby increasing the number of the central managing devices 20 per one group. Conversely, the predetermined threshold becomes smaller for the data caching unit 23 having the smaller free space, and therefore the number of the central managing devices 20 per one group is decreased.

Thus, the number of the cache data which the central managing device 20 obtains from the center server 10 is increased with an increase of the free space of the data caching unit 23. Therefore, it is possible to decrease the number of times at which the central managing device 20 accesses the center server 10.

Besides, the group managing unit 15 may divide the central managing devices 20 into plural groups on the basis of the contracts regarding the data communication between the central managing device 20 and the center server 10 each of which is made by an owner of the central managing device 20 and an owner of the center server 10. Each contract is ranked based on the services (e.g., the number of the provided services, and ranges) provided from the center server 10 to the central managing device 20. The central managing devices 20 having the contract of the same rank are classified into the same group.

Therefore, in this configuration, the group managing unit 15 performs grouping of the central managing devices 20 on the basis of the contracts of the data communication. Consequently, it is enabled to improve the hit probability regarding the cache data created by the center server 10.

The contracts need not be ranked based on the services. In this situation, the central managing devices 20 having the same contract may be classified into the same group.

Alternatively, the group managing unit 15 may be configured to calculate the degree of the similarity between the central managing devices 20 by use of the customer information (e.g., addresses, ages, family members, and incomes) regarding each central managing device 20, and classify the central managing devices 20 into groups on the basis of the calculated degree of the similarity.

The invention claimed is:

1. A home appliance managing system comprising:
a plurality of central managing devices, each central managing device being connected to a home appliance; and
a center server connected to the plurality of said central managing devices via a transmission path,
wherein said center server comprises a data controller, a data storage configured to store data used by said home appliance, and a data predictor,
said central managing device comprising a managing controller and a data cache,
said managing controller being configured to, in response to a request of predetermined data from said home appliance, judge whether or not said data cache stores the predetermined data,
and, when said data cache stores the predetermined data, obtain the predetermined data from the data cache and send the same to said home appliance,
and, when said data cache does not store the predetermined data, request said center server to provide the predetermined data,
said data controller being configured to, in response to a request of the predetermined data from said managing controller, obtain the requested predetermined data from said data storage and send the same to said managing controller,
said managing controller being configured to, upon receiving the predetermined data from said data controller, send the predetermined data to said home appliance and store the same in said data cache,
said data predictor being configured to select cache data from the data stored in said data storage on the basis of the data which is sent once from said center server to at least one of said central managing devices, said cache data being defined as data to be sent to said central managing device preliminarily,
said data controller being configured to send the cache data selected by said data predictor to said managing controller, and
said managing controller being configured to, upon receiving the cache data from said data controller, store the cache data in said data cache,
wherein said center server further comprises a group manager,
said group manager being configured to store a history for each central managing device, said history including a class of the data which said central managing device obtains from said center server and a timing at which said central managing device obtains the data,
said group manager being configured to determine, on the basis of the history, an obtaining pattern of data which said central managing device obtains from said center server, for each central managing device,
said group manager being configured to calculate a degree of similarity between the obtaining patterns of said central managing devices,
said group manager being configured to judge that the obtaining patterns are similar to each other when the degree of the similarity is not less than a predetermined threshold, and that the obtaining patterns are dissimilar from each other when the degree of the similarity is less than the predetermined threshold,
said group manager being configured to classify said central managing devices having the obtaining patterns similar to each other into the same group, and classify said central managing devices having the obtaining patterns dissimilar from each other into different groups, and
said data predictor being configured to select same class data having the same class as that of the data which said center server sends once to at least one of said central managing devices belonging to a specific group, and treat such class data as the cache data to be sent to another central managing device belonging to the specific group.

2. A home appliance managing system as set forth in claim 1, wherein
the same class data is defined as data which is created with respect to each of said central managing devices belonging to the same group and is created in the same format by use of information relating to said individual central managing device.

3. A home appliance managing system as set forth in claim 1, wherein said group manager is configured to perform grouping of said central managing devices at a predetermined interval.

4. A home appliance managing system as set forth in claim 1, wherein said managing controller is configured to calculate a hit probability indicating a probability that said data cache stores the data requested by said home appliance, and send the calculated hit probability to said center server, said group manager being configured to compare a predetermined value with the hit probability received from said managing controller of said central managing device, and exclude said central managing device having the hit probability not greater than the predetermined value from the group which said central managing device belongs to.

5. A home appliance managing system as set forth in claim 1, wherein said group manager is configured to select a lower predetermined threshold for said central managing device which is provided with said data cache having a larger memory capacity.

6. A home appliance managing system as set forth in claim 1, wherein said group manager is configured to divide said central managing devices into groups on the basis of contracts regarding data communication between said center server and said central managing device, said data predictor being configured to select data which said center server sends once to at least one of said central managing devices belonging to a specific group, and treat such data as the cache data to be sent to another central managing device belonging to the specific group.

* * * * *